United States Patent [19]

Wlassics et al.

[11] Patent Number: 5,382,337
[45] Date of Patent: Jan. 17, 1995

[54] PROCESS FOR OXIDIZING ORGANIC MATERIALS WITH HYDROGEN PEROXIDE UNDER CONDITIONS OF IRRADIATION IN AQUEOUS PHASE

[75] Inventors: Ivan Wlassics, Rapallo; Mario Alfieri; Walter Visentin, both of Milan, all of Italy

[73] Assignee: Ausimont S.p.A., Milan, Italy

[21] Appl. No.: 972,152

[22] Filed: Nov. 5, 1992

[30] Foreign Application Priority Data

Nov. 6, 1991 [IT] Italy ................ MI91A002950

[51] Int. Cl.$^6$ ............................................. C07B 33/00
[52] U.S. Cl. ........................ 204/158.2; 204/157.4; 204/157.6; 210/748; 210/759
[58] Field of Search ............... 204/57.4, 157.6, 158.2; 210/759, 748

[56] References Cited

U.S. PATENT DOCUMENTS

| | | | |
|---|---|---|---|
| 4,861,484 | 8/1989 | Lichtin et al. | 210/759 |
| 5,043,080 | 8/1991 | Cater et al. | 210/759 |
| 5,205,940 | 4/1993 | Graetzel | 210/748 |
| 5,266,214 | 11/1993 | Safarzedeh-Amiri | 210/759 |

FOREIGN PATENT DOCUMENTS 0047357   4/1979   Japan ...................... 210/759
WO91/13032 9/1991  WIPO .

OTHER PUBLICATIONS

Derwent Abstract 86-197652/31 of DE 3501528.
Derwent Abstract 83-847447.
Derwent Abstract 88-019118.
European Search Report EP 92 11 8279.

Primary Examiner—John Niebling
Assistant Examiner—C. Delacroix-Muirheid
Attorney, Agent, or Firm—Bryan Cave

[57] ABSTRACT

Process for oxidizing organic materials or compounds in aqueous phase, with hydrogen peroxide and in the presence of ferrous ions Fe-(II), and optionally cupric ions cu-(II), carried out under irradiation with artificial visible light.

16 Claims, 4 Drawing Sheets

PROCESS FOR OXIDIZING ORGANIC MATERIALS WITH HYDROGEN PEROXIDE UNDER CONDITIONS OF IRRADIATION IN AQUEOUS PHASE

BACKGROUND OF THE INVENTION

1. Field of the Invention

The present invention relates to a process for the purpose of oxidizing organic materials in aqueous phase with hydrogen peroxide ($H_2O_2$), under irradiation conditions.

In particular, the present invention relates to an improved process for oxidizing organic substrates, in aqueous phase, with hydrogen peroxide and in the presence of ferrous ions Fe-(II), and optionally cupric ions Cu-(II), carried out under irradiation with artificial visible light.

The process is particularly applicable in order to enable wastes of industrial origin to be disposed of, which are treated as aqueous dispersions, with a consumption of reactant (hydrogen peroxide), which may be 50% lower than as necessary in the case of the oxidation processes using hydrogen peroxide, known from the prior art.

2. Description of the Related Art

Processes for the oxidation of organic compounds in aqueous dispersion with the use of hydrogen peroxide as the oxidizer agent, are known.

It is known as well, that the mechanism of the oxidizing process in which hydrogen peroxide is used, is activated in general by transition metals, and, in particular, by ferrous ion Fe-(II), possibly associated with cupric ion Cu-(II).

The hydroxy radical OH°, generated by the decomposition of $H_2O_2$, was demonstrated to be responsible for the oxidation and hydroxylation of a wide range of organic and aliphatic compounds (substrates).

In particular, it is well-known that the reaction on a large number of organic substrates, in aqueous dispersion, carried out in the presence of Fe-(II) and possibly Cu-(II), can also take place in a catalytic way, because hydrogen peroxide oxidizes Fe-(II) yielding Fe-(III) and generating hydroxy radicals which oxidize the substrate yielding intermediate compounds, which, in their turn, may promote the reduction of Fe-(III) radicals to yield Fe-(II) radicals, bringing the cycle back to its initial state.

SUMMARY OF THE INVENTION

The present inventors have found that, according to the present invention, an oxidation process, with hydrogen peroxide, of organic compounds in aqueous phase, of the above type, can be enhanced by operating under irradiation conditions with artificial light.

Therefore, a purpose of the present invention is to provide an enhanced process for oxidizing organic substances or materials in aqueous dispersion, with the use of hydrogen peroxide in the presence of ferrous ions Fe-(II) and, optionally, cupric ions Cu-(II).

Another purpose is to provide a process for the oxidation of organic compounds in aqueous dispersion with an oxidation yield ("efficiency") which is increased up to approximately twice as high, as compared to the efficiency which can be reached according to the prior art, and with correspondingly reduced $H_2O_2$ consumption.

Finally, a further purpose is to provide a process within the scope of which such flexible parametric conditions exist, as to make it possible to carry out the process under conditions of graduality of oxidation of the organic compounds, up to their complete destruction (into $CO_2$).

These and still other purposes which will be clearer for those skilled in the art from the following disclosure, are achieved, according to the present invention, by a process for oxidizing organic materials or compounds, in aqueous phase, with hydrogen peroxide and in the presence of ferrous ions Fe-(II) and optionally cupric ions Cu-(II), which process is characterized in that the reaction is carried out by operating under conditions of irradiation with artificial visible light.

In the following, disclosure, by the expressions "organic materials" or "organic compounds", reference is made in general to substances and/or compounds, and/or combinations of substances or compounds which are of at least partially organic character, and which are capable of being oxidized, at least partially, by means of the process defined hereinabove.

Said materials may, e.g., be constituted by any organic substances oxidizable with $H_2O_2$, and, in particular, substances of phenolic character (phenols, substituted phenols, and so forth), aliphatic compounds, which may also contain functional moieties (aminic, amidic, carboxylated compounds, and so forth).

In an analogous way, for the purposes of the present disclosure, the definition of "aqueous phase" encompasses any physical form of homogeneous or heterogeneous dispersion in a substantially aqueous medium (solutions, suspensions, emulsions, colloids, and so forth).

As defined in greater detail, the process according to the present invention is applied to substrate in aqueous dispersion, which is maintained at a pH value lower than 7, by adding to said dispersion the salt which supplies ferrous ion Fe-(II) and optionally cupric ion Cu-(II) and $H_2O_2$, according to the stoichiometric ratio as necessary for the desired (partial or total) degree of oxidation of the (total) content of organic matter to be oxidized.

Particularly interesting results are achieved by either partially or totally keeping the operating conditions within the following parametric ranges:

concentration of the aqueous dispersion, preferably aqueous solution, of the substrate, comprised within the range of approximately from 0.01 to 5.0% by weight pH value approximately comprised within the range of from 2 to 7, and preferably of from 3 to 4, usually by adding, whenever necessary, $H_2SO_4$ or NaOH, in diluted solution;

ferrous ion Fe-(II) and cupric ion Cu-(II) are added as respective soluble salts thereof, such as Fe-(II) sulfate, Fe-(II) chloride, Fe-(II) nitrate, ammonium-Fe-(II) sulfate, Cu-(II) sulfate, and so forth. Co-using the corresponding ferric [Fe-(III)] salts is also possible. Fe-(II) sulfate and Cu-(II) sulfate are preferred owing to operating and economic reasons.

The Fe-(II) and Cu-(II) ions are usually added in amounts comprised within the range of from 50 to 1,000 ppm of Fe-(II) ion, and comprised within the range of from 0 to 440 ppm of Cu-(II) ion; preferably, equivalent amounts of both ions, comprised within the range of from 100 to 200 ppm, are used;

hydrogen peroxide is used according to a molar ratio, relatively to the substrate, or to the total of substrates present in the aqueous dispersion, which may vary, as a function of the stoichiometry of the (either partial or total) oxidation reaction envisaged, and of the concentration of the substrate to be oxidized.

For example, in the case of complete oxidation, with $CO_2$ being obtained as the end oxidation product, molar ratios comprised within the range of approximately from 1:1 to 2.5:1, relatively to the substrate to be oxidized, with reference to the total stoichiometry of the compound(s) which take part in the oxidationr reaction, are operative.

Finally, hydrogen peroxide is preferably metered to the liquors to be treated in a gradual, continuous way, in correlation with temperature, the nature of the organic material, the absorption, and so forth. The concentration of hydrogen peroxide does not constitute a discriminating parameter; due to reasons of operating simplicity and ease, hydrogen peroxide with a concentration comprised within the range of from 30% to 50% is preferably used.

The process is carried out under conditions of irradiation with application of artificial visible light within the usual range of from 350 to 700 h$\nu$, with values of total oxidation yield (efficiency) substantially corresponding to the theoretical maximal values being reached with applied useful visible light power values comprised within the range of from 50 to about 1,000 Watts/dm$^3$. Normally effective results are obtained with useful power values comprised within the range of approximately from 400 to 500 Watts/dm$^3$.

Also temperature can vary within wide limits, which are comprised between substantially room temperature values (10° C.) and 100° C., according to the operating conditions, and as a function of the quality and quantity of organic substances present, and so forth.

By operating under the above disclosed conditions, i.e., irradiating the aqueous reaction dispersion with artificial light within the visible range, as is better disclosed in the following, an unexpected result is reached: the efficiency of $H_2O$-Fe-(II) oxidative system is increased up to twice as high, as compared to the reaction carried out under the same conditions, but in the absence of irradiation.

The efficiency of oxidation of the oxidizer system on the substrate is of basic importance, because it reflects the amount of $H_2O_2$ (expressed as g/l of $H_2O_2$ at 100%) to be used in order to obtain a determined oxidation degree.

Therefore, the higher the efficiency of the oxidizer system, the smaller the amount of hydrogen peroxide actually required in order to perform the oxidation.

Therefore, within the scope of the present disclosure, the efficiency of the oxidation system indicates the degree of catalytic enhancement achieved with the use of irradiation according to the present invention.

By assuming, a priori, an efficiency of 100% for the oxidizer system accomplished in the absence of irradiation, the efficiency of the system of the present invention is calculated as the percent increase over said value, as the ratio of the percent decrease in COD value reached, to the value of the ratio of $O_2f/O_2r$, wherein $O_2f$ represents the amount of oxygen actually fed (as $H_2O_2$), and $O_2r$ represents the amount of oxygen demanded by the oxidation (also as $H_2O_2$).

As is demonstrated in the following examples, the change in efficiency of the total oxidation reaction (i.e., yielding $CO_2$ as the end oxidation product) on solutions containing a concentration of 25 g/l of p-nitrophenol, phenol, p-chlorophenol, formaldehyde and dimethylformamide, as a function of the ratio of actually supplied oxygen (as $H_2O_2$) to oxygen demand (as $H_2O_2$), is represented as $O_2f/O_2r$.

In this case, the ratio of $O_2f/O_2r$ represents the ratio of the concentration, expressed as g/l, of 100%-$H_2O_2$ actually added to the aqueous reaction dispersion/solution ($O_2f$), to the concentration, (still expressed as g/l of 100%-$H_2O_2$) which is necessary in order to completely oxidize the substrate with $CO_2$ being produced as the end oxidation product ($O_2r$), assuming for the system, a priori, an efficiency of 100%.

In the following disclosure, the following symbols have the following meaning:

PNF=p-nitrophenol
PCF=p-chlorophenol
HPWO=oxidation in aqueous phase with $H_2O$ and Fe-(II)/Cu-(II)
PH=phenol
FORMAL=formaldehyde
DMF=dimethylformaldehyde
h$\nu$=artificial visible light.

In Table 1, the efficiency values are reported which were reached on said substrates in aqueous solution, together with the values of percent reduction in COD ($\Delta$COD—Chemical Oxygen Demand).

In Table 1, for DMF+HPWO+h$\nu$ and DMF+HPWO reactions, the percent value is reported of oxidative breakdown reached.

In Table 2, the percent values of differences in COD values ($\Delta$COD %) are reported, which were observed in the same processes, under the same conditions. The symbols have the same meaning.

The irradiation applied alone (on PNF), in the absence of $H_2O_2$-Fe-(II) system, did not yield any detectable effects of decrease in COD values within a time period of 60 minutes.

TABLE 1

| Reaction | $O_2f/O_2r$ | Delta COD, % | Efficiency, % | Demolished DMF, % |
|---|---|---|---|---|
| PNF — HPWO + h$\nu$ | 0.220 | 38.5 | 175 | |
| Example 1 | 0.530 | 77.4 | 146 | |
| | 0.820 | 85.2 | 104 | |
| | 0.900 | 86.0 | 96 | |
| PNF — HPWO | 0.220 | 28.6 | 130 | |
| Comparative Example 2 | 0.530 | 60.5 | 121 | |
| | 0.820 | 83.6 | 102 | |
| | 0.900 | 85.0 | 94 | |
| PNF — HPWO | 0.260 | 23.5 | 92 | |
| (darkness) | 0.720 | 60.2 | 90 | |
| Comparative Example 3 | 1.000 | 91.0 | 90 | |
| PH — HPWO + h$\nu$ | 0.235 | 34.8 | 148 | |
| Example 5 | 0.520 | 71.0 | 136 | |
| | 0.720 | 95.7 | 132 | |
| | 0.870 | 96.4 | 111 | |
| | 1.200 | 96.4 | 77 | |
| | 1.560 | 100.0 | 64 | |
| | 2.200 | 100.0 | 48 | |
| PH — HPWO | 0.235 | 17.0 | 85 | |
| Comparative Example | 0.520 | 37.0 | 71 | |
| 5a | 0.720 | 49.7 | 69 | |
| | 0.870 | 60.0 | 69 | |
| | 1.200 | 83.0 | 69 | |
| | 1.560 | 99.8 | 64 | |
| | 2.200 | 100.0 | 46 | |
| PCF — HPWO + h$\nu$ | 0.260 | 43.0 | 165.0 | |
| Example 6 | 0.480 | 50.2 | 104.0 | |
| | 0.990 | 92.3 | 94.0 | |
| | 2.100 | 93.0 | 93.0 | |
| PCF — HPWO | 0.260 | 28.6 | 110.0 | |
| Comparative Example | 0.480 | 43.0 | 90.0 | |

TABLE 1-continued

| Reaction | $O_2f/O_2r$ | Delta COD, % | Efficiency, % | Demolished DMF, % |
|---|---|---|---|---|
| 6a | 0.990 | 63.0 | 64.0 | |
| | 2.100 | 100 | 47.0 | |
| FORMAL – HPWO + hv | 0.196 | 28.0 | 143.0 | |
| Example 7 | 0.450 | 54.4 | 121.0 | |
| | 0.670 | 73.5 | 110.0 | |
| | 1.000 | 95.0 | 95.0 | |
| | 1.400 | 100.0 | 71.4 | |
| FORMAL – HPWO | 0.196 | 26.0 | 132.0 | |
| Comparative Example 7a | 0.450 | 52.0 | 130.0 | |
| | 0.670 | 70.0 | 104.0 | |
| | 1.000 | 90.0 | 90.0 | |
| | 1.400 | 100.0 | 71.4 | |
| DMF – HPWO + hv | 0.400 | | | 90 |
| Example 8 | 0.750 | | | 100 |
| | 1.300 | | | 100 |
| | | | | 95 |
| DMF – HPWO | 0.400 | | | 35 |
| Comparative Example 8a | 0.750 | | | 55 |
| | 1.300 | | | 90 |

TABLE 2

| | Grams/liter of $H_2O_2$ consumed, as a function of % COD | | | | | | | | | |
|---|---|---|---|---|---|---|---|---|---|---|
| ΔCOD, % | PNF HPWO + hv Example 1 | PNF HPWO Example 2 | PHENOL HPWO + hv Example 5 | PHENOL HPWO Example 5a | PCF HPWO + hv Example 6 | PCF HPWO Example 6a | FORMAL HPWO + hv Example 7 | FORMAL HPWO Example 7a | DMF HPWO + hv Example 8 | DMF HPWO Example 8a |
| 0 | 0,00 | 0,00 | 0,00 | 0,00 | 0,00 | 0,00 | 0,00 | 0,00 | 0 | 0 |
| 10 | 4.43 | 6.12 | 6.28 | 10.69 | 5.76 | 7.66 | — | — | 5 | 10 |
| 20 | 8.96 | 12.51 | 13.20 | 25.15 | 11.02 | 15.21 | 6.40 | 7.10 | 10 | 21 |
| 40 | 19.30 | 26.35 | 26.40 | 55.33 | 24.45 | 38.28 | 13.05 | 14.30 | 19 | 46 |
| 60 | 32.07 | 41.19 | 42.14 | 84.60 | 43.58 | 72.18 | 21.70 | 23.00 | 28 | 82 |
| 80 | 52.87 | 58.39 | 58.50 | 112.90 | 68.50 | 128.78 | 33.60 | 36.00 | 40 | 112 |
| 90 | 80 | 80 | 69.70 | 126.70 | 83.19 | 157.62 | 40 | 45 | 60 | 130 |

As one may observe, the efficiency, for instance in the case of PNF, varies from values, for the conventional HPWO process, of 120–130%, at values of $O_2f/O_2r$ ratio comprised within the range of from 0.2 to 0.53, up to values of 146–175% for the process according to the present invention, at the same values, i.e., of from 0.2 to 0.53, of $O_2f/O_2r$ ratio.

The value of percent change in COD (ΔCOD), which, for values of $O_2f/O_2r$ was comprised within the range of from 0.2 to 0.53, respectively is of from 29% to 60% for the conventional HPWO process, and was increased up to 39% and 77% respectively, for the novel process HPWO+hv, under corresponding conditions.

According to the nature of the substrate(s) and of the parametric conditions adopted for their oxidation, irradiation times comprised within the range of from 1 minute to about 4 hours, can be sufficient.

BRIEF DESCRIPTION OF THE DRAWING

For greater clarity, in the charts displayed in accompanying FIGS. 1–4, the trend of the process according to the present invention, as applied to a solution containing 25 g/liter of p-nitrophenol (PFN) is shown as a function of $O_2f/O_2r$ ration, under such conditions as described in Example 1, as compared to the conventional HPWO process (Example 2), carried out under darkness conditions (Example 4) too.

As one may observe, the oxidation efficiency ranges from 130% to 120% in the case of the conventional (HPWO) process, with values of $O_2f/O_2r$ ratio comprised within the range of from 0.2 to 0.6; said values correspond to values of % decrease in COD (Chemical Oxygen Demand) comprised within the range of from 10% to 65%, as shown in FIG. 2. As indicated hereinabove, the value of COD is directly correlated with the amount of $O_2$ demanded for the oxidation of the organic matter contained in the solution.

Figure 1:
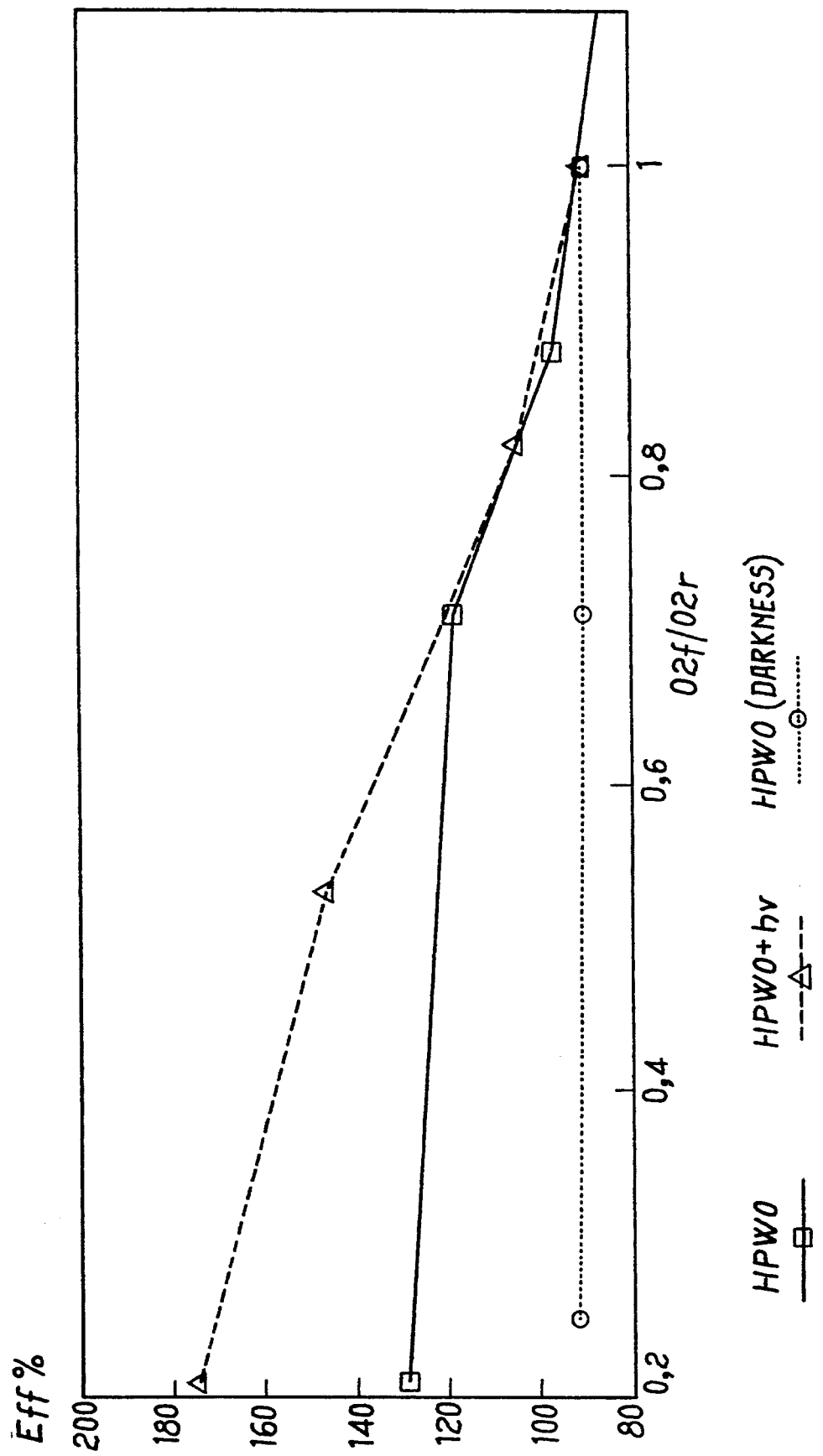

The decrease in COD during the course of the oxidation reaction is the measure of the amount of organic matter completely oxidized to yield $CO_2$ as the end oxidation product. The "HPWO+hv" line in FIG. 1 shows the surprising result obtained according to the present invention: by irradiating the reaction mixture containing PNF (as disclosed in Example 1), the reaction efficiency is comprised within the range of from 175% to 137%, at values of $O_2f/O_2r$ ratio comprised within the range of from 0.2 to 0.6—i.e., of a percent decrease in COD comprised within the range of from 20% to 80%.

Figure 2:
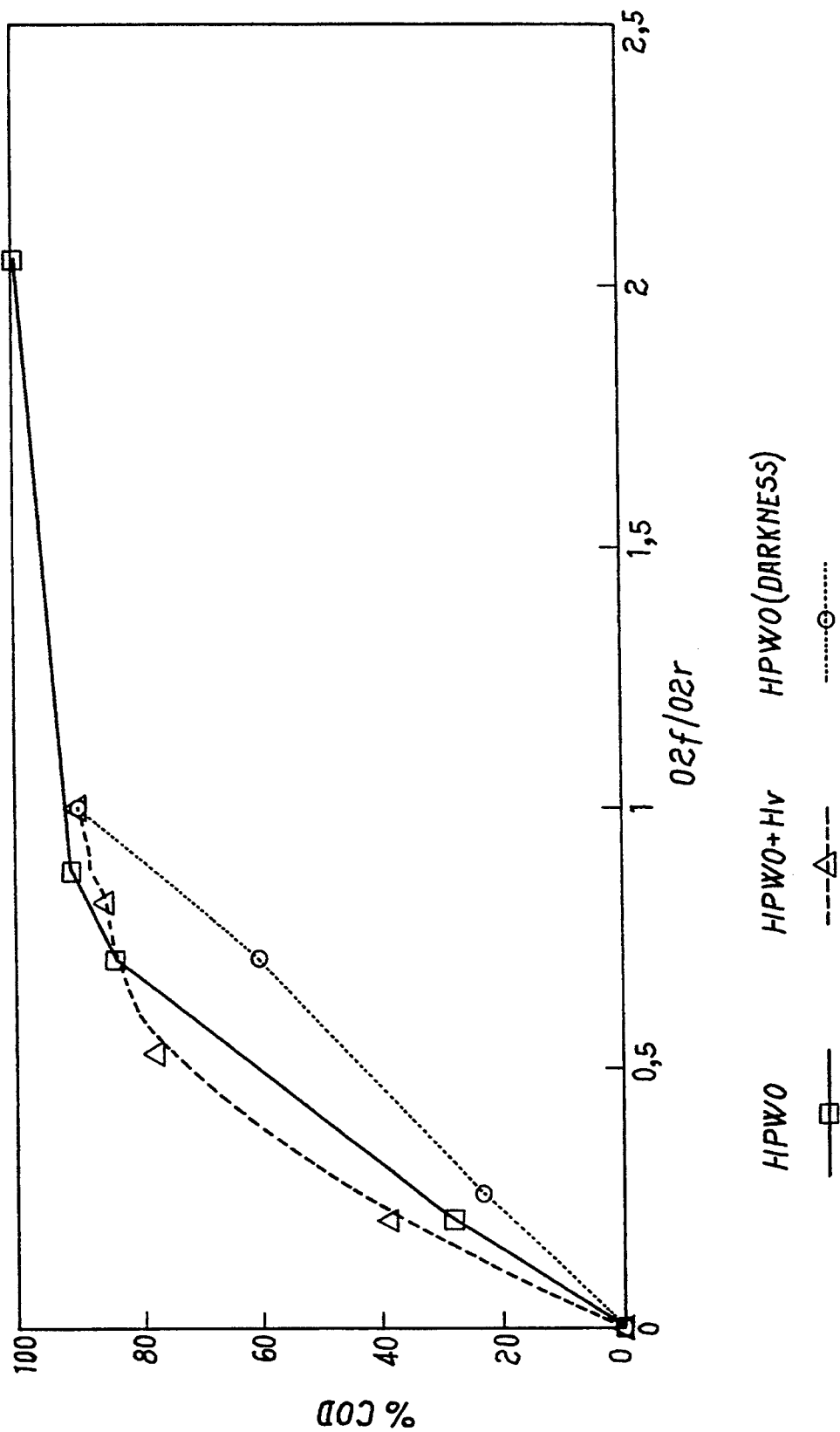

The line "HPWO+v" shown in FIG. 2 demonstrates that by means of the process according to the present invention, a % decrease in COD is obtained as a function of the ratio of $O_2f/O_2r$, which is higher than obtainable by means of the HPWO reaction known from the prior art, until a value of % COD decrease of 80% is reached; at that value, the % decrease in COD and the % efficiency of all systems become substantially identical.

Figure 3:
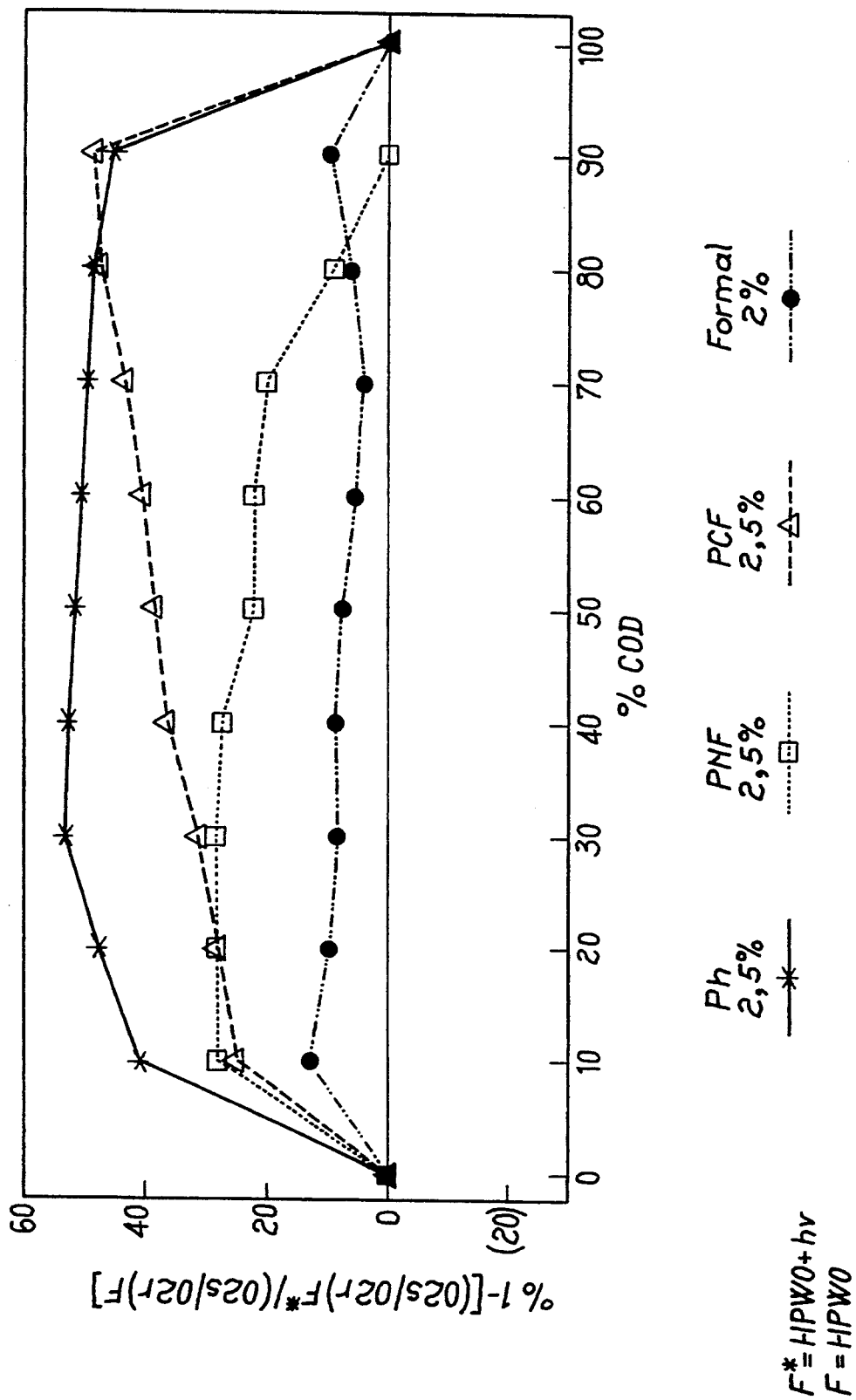

FIG. 3 demonstrates the benefit yielded by the process according to the present invention, as compared to the known HPWO process (without irradiation), on various substrates. On the ordinate, the percentage of "benefit" of the oxidative system is reported, expressed as the percent-difference between the $O_2f/O_2r$ ratios relevant to the process of the invention "HPWO+v" and those relevant to the conventional process "HPWO". On the abscissa, the % decrease in COD is reported. Positive values represent the percent benefit (O=HPWO) of the process according to the present invention, over the HPWO process known from the prior art.

Figure 4:
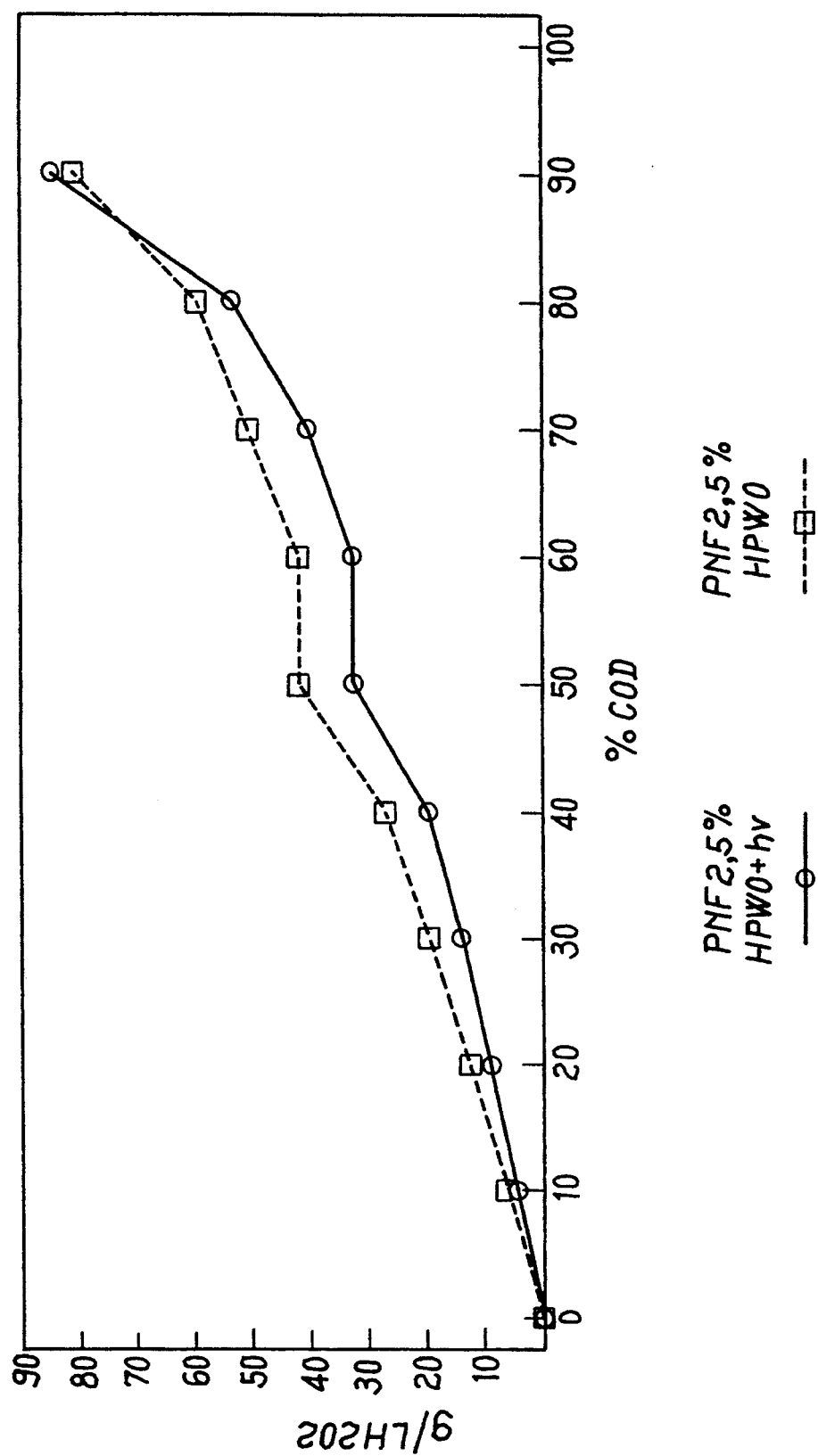

According to the PNF line in FIG. 3, one may observe that, within the range of values of % decrease in COD of from 10% to 80%, the process according to the present invention shows an average benefit of 26%. The process of the invention is nearly comparable to the known HPWO process only as regards the oxidation of the last 10% of organic matter. Finally, FIG. 4 explicitly shows the saving in $H_2O_2$ as a function of the % decrease in COD.

In the case of a solution containing 25 g/l of PNF, in order to obtain a % decrease in COD of 70%, 50 g/l of 100%-$H_2O_2$ and 40 g/l of 100%-$H_2O_2$ are necessary in HPWO process, and in the process of the present invention respectively.

The saving is of 10 g/l of 100%-$H_2O_2$ per each liter of waste liquors containing 25 g/l of PNF.

Analogous remarks may be made from an examination of Table 1 and 2, with reference to the other substrates tested.

Summing-up, the process according to the present invention secures a higher oxidation efficiency than the HPWO technique known from the prior art, on a wide range of organic compounds: from phenols to substituted phenols, to aliphatic compounds with amidic, aldehydic or carboxy functional groups, making possible a considerable saving in the amount of $H_2O_2$ to be used for their oxidation.

DESCRIPTION OF THE PREFERRED EMBODIMENTS

The present invention is disclosed now in greater detail by referring to the following examples, which anyway are supplied for merely illustrative purposes.

In the examples, the symbols have the same meanings as specified hereinabove.

Examples 2 (repetition of Example 1, without irradiation); 3 (repetition of Example 1, with only application of irradiation, without $H_2O_2$); 4 (repetition of Example 2, under darkness conditions), are given for comparison purposes.

EXAMPLE 1

Inside a flask equipped with condenser, dripping funnel, thermometer and magnetic-anchor stirred, 6.38 g of p-nitrophenol (PNF) is dissolved in 225 ml of distilled water, with an initial concentration of 25 g/l of PNF being obtained. Then, a sample of 5 ml is drown in order to measure the COD value at t=0 (zero time), with the initial volume of the reaction solution being reduced down to 250 ml. The pH value of the mixture is then adjusted to 3.5, by adding 0.15 ml of $H_2SO_4$ at 96%. To the mixture, 0.25 g of $FeSO_4.7H_2O$, equivalent to 201 ppm of Fe-(II) and 0.2 g of $CuSO_4.5H_2O$, equivalent to 204 ppm of Cu-(II) are added. The flask is dipped in an oil bath, until an inner temperature of 97° C. is reached, then a mild stirring of flask contents is started up. Laterally, outside the reaction flask, a 100 W tungsten lamp is installed, so positioned that the light beam is directed form up downwards, in order to better irradiate the mixture contained inside the flask. The flask, the lamp and the oil bath are then wrapped with an aluminum foil, in order to obtain the maximum irradiation exclusively of the reaction mixture, and in order to simulate the presumable actual operating conditions in a full-scale facility.

The reaction is started by dropwise adding $H_2O_2$ at 49.88%, charged to a graduated dripping funnel of 25 ml of capacity. The dropwise addition rate is 0.5–0.55 ml/minute. The pH value of the reaction mixture is monitored as follows: 3 ml of the reaction mixture is collected with a pipette and is charged to a test tube. The collected sample is cooled down to room temperature with tap water. The electrode of a pH-meter is dipped in the cooled solution and the pH value of the latter is measured. The 3-ml sample collected is then immediately returned back into the reaction flask. The pH value is kept within the range of from 3.2 to 3.8—i.e., of 3.5±0.3, by adding 0.25 ml of NaOH at 10% per each dpH=−1 from 3.5, or by adding 0.2 ml of $H_2SO_4$ at 15% per each dpH=+1 from 3.5. The samples of reaction mixture are collected when the added amount of $H_2O_2$ at 49.88% corresponds to the following values of $O_2f/O_2r$ ratio: 0.22; 0.5; 0.8; 0.9 and 1.2 (respectively corresponding to 11.5; 28; 37; 44.5 and 63 ml of $H_2O_2$ at 49.88%). Each sampling consists in drawing 5 ml of reaction mixture.

The reaction time was 120 minutes. On each sample drawn, the COD value was measured according to the standard method with potassium dichromate. The ratio of % COD decrease to the value of $O_2f/O_2r$ yields the % efficiency of the oxidation at that reaction time. The results are reported in Tables 1 and 2 and in FIGS. 1 to 4.

EXAMPLE 2

Comparative Example

The same concentrations of PNF, $FeSO_4.7H_2O$ and $CuSO_4.5H_2$ are used and the same procedures as disclosed in Example 1 are followed. The lamp is not used, and the reaction system is not wrapped with aluminum foil, it being therefore left exposed to daylight. The samplings are carried out at the same values of $O_2f/O_2r$ ratio, as reported in Example 1. The results are reported in Tables 1 and 2, and in FIGS. 1–4.

EXAMPLE 3

Comparative Example

The same concentrations of PNF and of reactants are used and the same procedures as disclosed in Examples 1 are followed; however, $FeSO_4.7H_2O$ and $CuSO_4.5H_2$ are not used (with the dripping funnel being consequently omitted from the reaction system). The pH value is measured every 20 minutes, same way as disclosed in Example 1. Only two samples of 5 ml each are collected, the first one at t=0 and the second one at t=60 minutes. The oxidation reaction with only light irradiation, in the absence of $H_2O_2$, did not give any results.

EXAMPLE 4

Comparative Example

The same concentrations of PNF and reactants are used, and the same modalities are followed, as disclosed in Example 2. Therefore, the reaction equipment is wrapped with an aluminum foil, with daylight being completely excluded from the reaction chamber. The samples are collected at values of $O_2f/O_2r$ ratio, of 0.26; 0.72 and 1. The results are reported in Table 1 and in Tables 1 and 2.

EXAMPLE 5 AND COMPARATIVE EXAMPLE 5a

The efficiency of phenol oxidation carried out by means of the process according to the present invention (Example 5) was compared to the efficiency of said oxidation when it was carried out by means of the HPWO process known from the prior art (Comparative Example 5a). The concentration of phenol was of 25 g/liter in both cases. The concentrations of reactants and the reaction modalities were the same as disclosed in Example 1 (according to the invention) and in Example 2 (HPWO, without irradiation with light), respectively. The samples were drawn, for both the processes according to the invention (Example 5) and of Comparative Example 5a (HPWO), at values of $O_2f/O_2r$ ratio, of 0.235; 0.52; 0.72; 0.87; 1.2; 1.56 and 2.2. The results are reported in Tables 1 and 2, and in Table 3. The process according to the invention (Example 5) is 1.76 times as efficient as the HPWO system (Comparative Example 5a), up to a ratio of $O_2f/O_2r$ of 1.4—which corresponds to a 95% decrease in COD. The benefit of the process of the invention over HPWO process is shown in FIG. 3, from which one may observe that the process according to the invention shows a 50% advantage over the HPWO process, within a range of % COD decrease values of from 10% to 90%.

EXAMPLE 6 AND COMPARATIVE EXAMPLE 6a

The efficiency of p-chlorophenol (PCF) oxidation carried out by means of the process according to the present invention (Example 6) was compared to the efficiency of the same oxidation, when it was carried out by means of the HPWO process known from the prior art (Comparative Example 6a). The concentration of PCF was 25 g/liter in both cases. The concentrations of reactants and the reaction modalities were the same as disclosed in Examples 1 and 2, respectively relating to the process of the invention and HPWO. The samples were drawn, for both the processes according to the invention (Example 6) and of Comparative Example 6a (HPWO), at values of $O_2f/O_2r$ ratio, of 0.26; 0.48; 0.99 and 2.1. The results are reported in Tables 1 and 2, and in FIG. 3.

The process according to the invention is 33% more efficient than HPWO at a ratio of $O_2f/O_2r$ of 0.25. It can be observed that by means of the process according to the invention, a COD decrease of 90% is reached with a ratio of $O_2f/O_2r$ of 1, whilst the same % COD decrease is reached with HPWO process with a ratio of $O_2f/O_2r$ of 1.9.

The advantage of the process of the invention over HPWO process is shown in FIG. 3.

It can be observed that the average advantage, within a range of % COD decrease values of from 10% to 90%, is of 35%. In Table 2, the lower consumption of $H_2O_2$ made possible by the process according to the invention is evidenced.

EXAMPLE 7 AND COMPARATIVE EXAMPLE 7a

The efficiency of oxidation of a solution containing 20 g/l of formaldehyde carried out by means of the process according to the present invention (Example 7) was compared to the efficiency of the same oxidation, when it was carried out by means of the HPWO process known from the prior art (Comparative Example 7a). The concentrations of reactants and the reaction modalities were the same as disclosed in Examples 1 and 2. The samples were drawn, for both the processes according to the invention (Example 7) and Comparative Example 7a (HPWO), at values of $O_2f/O_2r$ ratio of 0.196; 0.450; 0.670; 1 and 1.4.

The results are reported in Tables 1 and 2, and in FIG. 3.

As shown in FIG. 3, the "advantage" of the process of the invention, within a range of % COD decrease values of from 10% to 90%, is of 10%.

On an average, the oxidation efficiency results are 15-20% higher in the process according to the invention, than in HPWO process.

EXAMPLE 8 AND COMPARATIVE EXAMPLE 8a

The decrease in concentration of a solution containing 25 g/l of dimethylformamide (DMF), caused by the oxidation reaction, was compared for the process according to the invention (Example 8) and the HPWO process (Comparative Example 8a).

The concentrations of reactants and the reaction modalities were as disclosed in Examples 1 and 2 respectively.

The samples were drawn in both oxidation processes after adding $H_2O_2$ at $O_2f/O_2r$ ratios of 0.4; 0.75; 1.3.

The reactions of both processes were compared by comparing the % decrease in DMF concentration, as referred to the value of $O_2f/O_2r$ ratio, for each sample drawn. The data reported in Tables 1 and 2 show that after values of $O_2f/O_2r$ ratio of 0.4 and 0.75, the % decreases in DMF concentration were of 80% and 90% respectively for the process according to the invention, whereas with the same values of $O_2f/O_2r$ ratio, the % decreases in DMF concentration were of 35% and 55%, respectively, for the HPWO process.

Table 2 sets forth the amount of $H_2O_2$, expressed as grams of 100-% $H_2O_2$ per each liter of waste liquors, which is saved with the process according to the present invention, relatively to HPWO. It can be seen that from a decrease in DMF of 20%, up to a decrease in DMF of 90%, an average of 59% of 100%-$H_2O_2$ is saved with the process of the invention, per each liter of waste liquors containing 25 g/l of DMF to be oxidized.

We claim:

1. A photocatalytic process for oxidizing an organic substrate selected from the group consisting of phenols, substituted phenols, and aliphatic compounds with amidic, aldehydic, or carboxy functional groups, which comprises reacting the substrate in a homogeneous, substantially aqueous medium with hydrogen peroxide in the presence of ferrous Fe-(II) ions and, optionally, ferric Fe-(III) and cupric Cu-(II) ions, and carrying out the reaction under irradiation with artificial visible light within the wavelength range of 350 to 700 nanometers, wherein the hydrogen peroxide is added to the reaction medium in an amount such that the ratio of the concentration $O_2f$, expressed as g/l of 100% $H_2O_2$ actually added to the aqueous medium, to the concentration $O_2r$, expressed as g/l of 100% $H_2O_2$ necessary to completely oxidize the substrate to $CO_2$, is within the range of from 0.2 to 0.53.

2. The process of claim 1, wherein said medium is a solution, suspension, emulsion or colloid.

3. The process of claim 1, wherein the process is carried out at a pH value of up to 7.

4. The process of claim 3, wherein the process is carried out at a pH value of from 2 to 7.

5. The process of claim 4, wherein the process is carried out at a pH value of from 3 to 4.

6. The process of claim 1, wherein the concentration of the organic substrate in the aqueous medium is from 0.01 to 5.0% by weight.

7. The process of claim 1, wherein the ferrous ion Fe-(II) is added to the reaction mixture as a salt selected from the group consisting of Fe-(II) sulfate, Fe-(II) chloride, Fe-(II) nitrate, ammonium-Fe-(II) sulfate, and mixtures of said salts with the corresponding ferric Fe-(III) salts.

8. The process of claim 1, wherein the ferrous Fe-(II) ion is added to the reaction mixture in association with cupric Cu-(III) ion.

9. The process of claim 1, wherein the ferrous Fe-(II) ion and cupric Cu-(II) ion are added to the reaction mixture as $FeSO_4$ and $CuSO_4$, respectively.

10. The process of claim 1, wherein the ferrous Fe-(II) ion is added to the reaction mixture in amounts of from 50 to 1,000 ppm.

11. The process of claim 1, wherein the cupric Cu-(II) ion is added to the reaction mixture in amounts of from 0 to 440 ppm of Cu-(II) ion.

12. The process of claim 1, wherein the ferrous Fe-(II) ion and cupric Cu-(II) ion are added to the reaction mixture in equivalent amounts, within the range of from 100 to 200 ppm.

13. The process of claim 1, wherein the hydrogen peroxide is added to the reaction mixture in metered amounts of from 1 to 2.5 parts per part of the substrate to be oxidized.

14. The process of claim 13, wherein the hydrogen peroxide added to the reaction mixture is in a concentrated solution containing from 30% to 50% by weight of hydrogen peroxide.

15. The process of claim 1, wherein the process is carried out at a temperature of from 10° C. to 100° C.

16. The process of claim 1, wherein the irradiation with artificial visible light is carried out with an applied useful power of from 50 to 1,000 Watts/dm$^3$.

* * * * *